(12) United States Patent
Gao et al.

(10) Patent No.: US 11,514,360 B2
(45) Date of Patent: Nov. 29, 2022

(54) METHOD AND SYSTEM FOR VERIFYING STATE MONITOR RELIABILITY IN HYPER-CONVERGED INFRASTRUCTURE APPLIANCES

(71) Applicant: Dell Products L.P., Hopkinton, MA (US)

(72) Inventors: Han Gao, Shanghai (CN); Wenyu Tang, Nanjing (CN); Huiying Shen, Shanghai (CN); Muzhar S. Khokhar, Shrewsbury, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 759 days.

(21) Appl. No.: 16/509,931

(22) Filed: Jul. 12, 2019

(65) Prior Publication Data
US 2021/0012238 A1    Jan. 14, 2021

(51) Int. Cl.
| | | |
|---|---|---|
| *G06F 11/00* | (2006.01) | |
| *G06N 20/00* | (2019.01) | |
| *G06F 7/14* | (2006.01) | |
| *G06N 5/00* | (2006.01) | |
| *G06F 11/30* | (2006.01) | |
| *G06F 11/34* | (2006.01) | |
| *G06F 11/07* | (2006.01) | |
| *G06F 11/22* | (2006.01) | |

(52) U.S. Cl.
CPC ............... *G06N 20/00* (2019.01); *G06F 7/14* (2013.01); *G06F 11/008* (2013.01); *G06F 11/0793* (2013.01); *G06F 11/2257* (2013.01); *G06F 11/3041* (2013.01); *G06F 11/3065* (2013.01); *G06F 11/3495* (2013.01); *G06N 5/003* (2013.01)

(58) Field of Classification Search
CPC .............. G06F 11/008; G06F 11/0793; G06F 11/2257; G06F 11/3041; G06F 11/3065; G06F 11/3495; G06F 7/14
See application file for complete search history.

(56) References Cited

U.S. PATENT DOCUMENTS

| | | | | |
|---|---|---|---|---|
| 8,850,263 | B1 * | 9/2014 | Yourtee | G06F 11/3476 |
| | | | | 714/20 |
| 9,262,253 | B2 * | 2/2016 | Jain | H04L 41/065 |
| 9,311,176 | B1 * | 4/2016 | Khokhar | G06F 11/30 |

(Continued)

OTHER PUBLICATIONS

Quinlan, J. R. 1986. Induction of Decision Trees. Mach. Learn. 1, 1 (Mar. 1986), 81-106 (26 pages).

*Primary Examiner* — Elmira Mehrmanesh
(74) *Attorney, Agent, or Firm* — Chamberlain, Hrdlicka, White, Williams & Aughtry

(57) ABSTRACT

A method and system for verifying state monitor reliability in hyper-converged infrastructure (HCI) appliances. Specifically, the method and system disclosed herein entail using a supervised machine learning model—i.e., a classification decision tree—to accurately distinguish whether conflicting event notifications, logged across multiple state monitors tracking state on an HCI appliance, are directed to a real event or a non-real event. The classification decision tree, generated based at least on information gains calculated for the multiple state monitors, may reflect which state monitor(s) is/are more reliable in accurately classifying the conflicting event notifications.

19 Claims, 10 Drawing Sheets

(56) References Cited

U.S. PATENT DOCUMENTS

| | | | | |
|---|---|---|---|---|
| 9,818,067 | B2* | 11/2017 | Miranda | G06N 20/00 |
| 10,069,699 | B2* | 9/2018 | Kimura | H04L 41/069 |
| 2013/0042147 | A1* | 2/2013 | Tonouchi | G06F 11/0781 |
| | | | | 714/37 |
| 2015/0149826 | A1* | 5/2015 | Anderson | G06F 11/0793 |
| | | | | 714/37 |
| 2016/0124792 | A1* | 5/2016 | Togawa | G06F 11/0751 |
| | | | | 714/37 |
| 2016/0335260 | A1* | 11/2016 | Convertino | G06F 16/2358 |
| 2017/0169342 | A1* | 6/2017 | Waltinger | G06F 11/008 |
| 2017/0316343 | A1* | 11/2017 | Shamsi | G06F 11/3495 |
| 2018/0276019 | A1* | 9/2018 | Ali | G06F 11/1469 |
| 2018/0288074 | A1* | 10/2018 | Thayer | H04L 63/145 |
| 2018/0365085 | A1* | 12/2018 | Li | G06F 9/542 |
| 2019/0373052 | A1* | 12/2019 | Pollitt | G06F 9/5072 |

* cited by examiner

| Event No. | SM-A 404A | SM-B 404B | SM-C 404C | Target 422 |
|---|---|---|---|---|
| 1 | YES | YES | YES | YES |
| 2 | YES | NONE | YES | YES |
| 3 | YES | NONE | NO | YES |
| 4 | NO | NO | YES | NO |
| 5 | NONE | YES | NO | YES |
| 6 | NONE | NONE | YES | NO |
| 7 | NONE | YES | YES | YES |
| 8 | YES | YES | NONE | YES |
| 9 | YES | NONE | NONE | YES |
| 10 | YES | NO | NONE | YES |
| 11 | NO | YES | YES | NO |
| 12 | NO | NONE | YES | NO |

Event Log Inputs 424 — Target Event Classifications

Example Classifier Training Package 420

Classifier Input Tuple 426

SM-B 404B → Target 422

YES: 05  NO: 02  NONE: 06  TOTAL: 13
YES-YES: 04  YES-NO: 01
NO-YES: 01  NO-NO: 01
NONE-YES: 04  NONE-NO: 02

Entropy(SM-B): 0.8551 bits   Information Gain(SM-B): 0.0354

FIG. 4F

SM-C 404C → Target 422

YES: 07  NO: 02  NONE: 04  TOTAL: 13
YES-YES: 04  YES-NO: 03
NO-YES: 02  NO-NO: 00
NONE-YES: 03  NONE-NO: 01

Entropy(SM-C): 0.7801 bits   Information Gain(SM-A): 0.1104

Target vs. Test Event Classification Comparison 436

| | Event Log Inputs 424 | | | Target Event Classifications | Test Event Classifications |
|---|---|---|---|---|---|
| Event No. | SM-A 404A | SM-B 404B | SM-C 404C | Target 422 | Test 438 |
| 1 | YES | YES | YES | YES | YES |
| 2 | YES | NONE | YES | YES | YES |
| 3 | YES | NONE | NO | YES | YES |
| 4 | NO | NO | YES | NO | NO |
| 5 | NONE | YES | NO | YES | YES |
| 6 | NONE | NONE | YES | NO | UNSURE |
| 7 | NONE | NONE | YES | YES | UNSURE |
| 8 | YES | YES | YES | YES | UNSURE |
| 9 | YES | YES | NONE | YES | YES |
| 10 | YES | NONE | NONE | YES | YES |
| 11 | YES | NO | NONE | YES | YES |
| 12 | NO | YES | NONE | NO | NO |
| 13 | NO | NONE | YES | NO | NO |

*FIG. 4H*

METHOD AND SYSTEM FOR VERIFYING STATE MONITOR RELIABILITY IN HYPER-CONVERGED INFRASTRUCTURE APPLIANCES

BACKGROUND

As server architecture becomes more complex, the detection of the status of a server also becomes increasingly difficult. Through hyper-converged infrastructure architecture, servers have evolved to integrate various resources within a single solution, which is advantageous to various usage applications, however, at the cost of maintaining simplistic status monitoring systems that do not exert the benefits of the architecture.

SUMMARY

In general, in one aspect, the invention relates to a method for reliably classifying event notifications. The method includes obtaining a first local event log from a first state monitor and a second local event log from a second state monitor, merging the first local event log and the second local event log to generate a first global event log comprising a first event notification, deriving, from the first global event log, a first set of event log inputs including a first classifier input tuple associated with the first event notification, determining, for the first event notification, a first event classification using the first classifier input tuple and an optimized event classifier, and performing a first action based at least on the first event classification.

In general, in one aspect, the invention relates to a system. The system includes a plurality of state monitors comprising a first state monitor and a second state monitor, and a state monitor manager operatively connected to the plurality of state monitors, and configured to obtain a first local event log from the first state monitor and a second local event log from the second state monitor, merge the first local event log and the second local event log to generate a global event log including an event notification, derive, from the global event log, a set of event log inputs including a classifier input tuple associated with the event notification, determine, for the event notification, an event classification using the classifier input tuple and an optimized event classifier, and perform an action based at least on the event classification.

In general, in one aspect, the invention relates to a non-transitory computer readable medium. The non-transitory computer readable medium includes computer readable program code, which when executed by a computer processor, enables the computer processor to obtain a first local event log from the first state monitor and a second local event log from the second state monitor, merge the first local event log and the second local event log to generate a global event log including an event notification, derive, from the global event log, a set of event log inputs including a classifier input tuple associated with the event notification, determine, for the event notification, an event classification using the classifier input tuple and an optimized event classifier, and perform an action based at least on the event classification.

Other aspects of the invention will be apparent from the following description and the appended claims.

BRIEF DESCRIPTION OF DRAWINGS

FIGS. 4A-4H show an example scenario in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for verifying state monitor reliability in hyper-converged infrastructure (HCI) appliances. Specifically, one or more embodiments of the invention entails using a supervised machine learning model—i.e., a classification decision tree—to accurately distinguish whether conflicting event notifications, logged across multiple state monitors tracking state on an HCI appliance, are directed to a real event or a non-real event. The classification decision tree, generated based at least on information gains calculated for the multiple state monitors, may reflect which state monitor(s) is/are more reliable in accurately classifying the conflicting event notifications.

Figure 1:
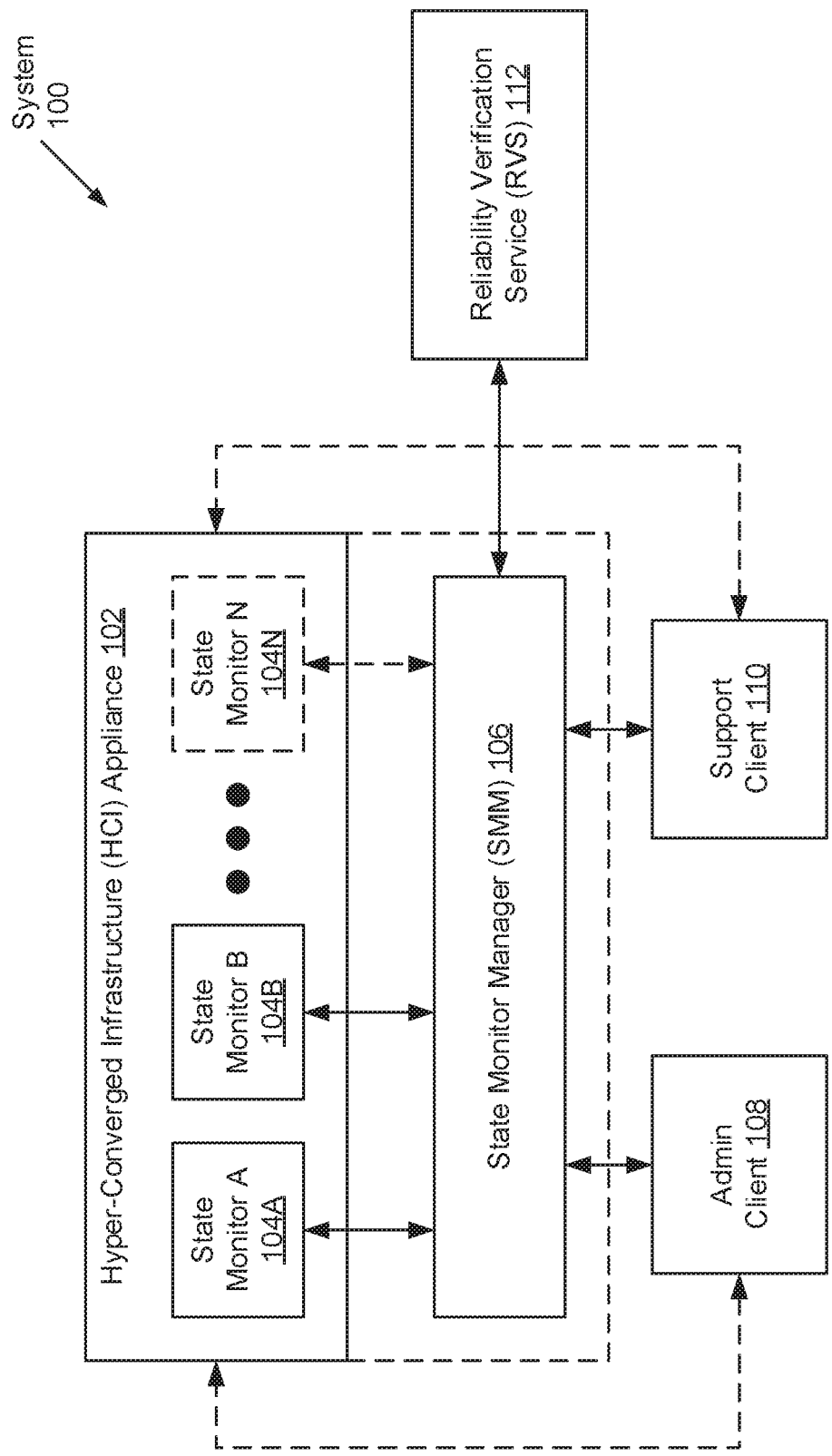
FIG. 1 shows a system in accordance with one or more embodiments of the invention.

FIG. 1 shows a system in accordance with one or more embodiments of the invention. The system (100) may include a hyper-converged infrastructure (HCI) appliance (102), a state monitor manager (SMM) (106), an admin client (108), a support client (110), and a reliability verification service (RVS) (112). Each of these system (100) components is described below.

In one embodiment of the invention, the various aforementioned system (100) components may be directly or indirectly connected to one another through a network (not shown) (e.g., a local area network (LAN), a wide area network (WAN) such as the Internet, a mobile network, etc.). The network may be implemented using any combination of wired and/or wireless connections. In embodiments in which the various aforementioned system (100) components are indirectly connected, there may be a diversity of networking components or systems (e.g., switches, routers, gateways, etc.) that may facilitate inter-communications. Further, the various aforementioned system (100) components may communicate with one another using any combination of wired and/or wireless communication protocols.

In one embodiment of the invention, the HCI appliance (102) may represent a physical device that reflects hyper-convergent architecture, at least with respect to configuration and operation. Hyper-convergent architecture may entail the software-centric or software-defined integration of virtualization, computing, storage, and networking resources into a single solution. The solution may take form as a software stack, a hardware appliance, or a combination thereof. Furthermore, the HCI appliance (102) may include functionality to service one or more specific usage scenarios—e.g., large scale and complex data processing. Examples of the HCI appliance (102) may include, but are not limited to, a workstation computer, a server, a mainframe, or any computing system similar to the exemplary computing system shown in FIG. 5.

In one embodiment of the invention, the HCI appliance (102) may include, or may operatively connect with, two or more state monitors (104A-104N). Each state monitor (104A-104N) may represent a physical device (i.e., computer hardware), a computer program executing on a physical device, or a combination thereof. Further, each state monitor (104A-104N) may be responsible for tracking a state (or status) of one or more components of the HCI appliance (102). Examples of HCI appliance (102) components for which state may be tracked across the state monitors (104A-104N) may include, but are not limited to, hardware components (e.g., computer processors, physical memory, storage media, power supplies, peripherals, network adapters, etc.), virtualization components (e.g., hypervisors, virtual resource pools, virtual machines, containers, etc.), software components (e.g., operating system, applications, utilities, device drivers, etc.), or any combination thereof. Accordingly, each state monitor (104A-104N) may include functionality to: monitor at least a portion of HCI appliance (102) state (i.e., state information associated with at least one HCI appliance (102) component); maintain a local event log that may record event notifications pertinent to the HCI appliance (102) component(s) tracked by the state monitor (104A-104N); and provide, upon request or through periodic pushing, the aforementioned portion of HCI appliance (102) state and the local event log to the SMM (106). One of ordinary skill will appreciate that each state monitor (104A-104N) may perform other functionalities without departing from the scope of the invention.

In one embodiment of the invention, the HCI appliance (102) component(s), observed by any given state monitor (104A-104N), may or may not overlap with the HCI appliance (102) component(s), which may be observed by any other given state monitor (104A-104N). By way of an example, a first state monitor (104A-104N) may track state pertaining to a central processing unit (CPU) installed on the HCI appliance (102), whereas a second state monitor (104A-104N) may track state pertaining to a storage disk drive installed on the HCI appliance (102). In this example, the CPU and storage disk drive are mutually exclusive HCI appliance (102) components and, accordingly, the overlapping of states (or statuses) tracked across the state monitors (104A-104N) does not occur. On the other hand, by way of another example, the first state monitor (104A-104N) may alternatively track state pertaining to a virtual storage pool instantiated on the HCI appliance (102), which may encompass available storage space from multiple storage disk drives (including the aforementioned storage disk drive for which state is tracked by the second state monitor (104A-104N)). In this other example, the storage disk drive represents a subset of the virtual storage pool and, accordingly, the overlapping of states (or statuses), at least in part, tracked across the state monitors (104A-104N) does transpire.

In one embodiment of the invention, the SMM (106) may represent a physical device (e.g., computer hardware), a computer program executing on a physical device, or a combination thereof, which may reside on or may operatively connect to the HCI appliance (102). Further, the SMM (106) may be responsible for aggregating and managing overall HCI appliance (102) state and logged event notifications. To that extent, the SMM (106) may include functionality to perform any subset or all of the various steps outlined in the method depicted in FIG. 2. Moreover, one of ordinary skill will appreciate that the SMM (106) may perform other functionalities without departing from the scope of the invention.

In one embodiment of the invention, the admin client (108) may represent any physical computing system operated by one or more administrators of the HCI appliance (102). An administrator of the HCI appliance (102) may refer to an individual or entity whom may be responsible for overseeing HCI appliance (102) operations and maintenance. At least with respect to overseeing the operations and maintenance of the HCI appliance (102), the admin client (108) may interact with the HCI appliance (102) and the SMM (106). To the extent of at least interacting with the latter, the admin client (108) may include functionality to, upon request or through periodic pushing, obtain event advisories (i.e., determined event classifications based on a machine learning classifier) concerning event notifications recorded on a global event log maintained by the SMM (106). The global event log may refer to an appliance-wide event log for recording event notifications aggregated from multiple state monitors (104A-104N). Furthermore, one of ordinary skill will appreciate that the admin client (108) may perform other functionalities without departing from the scope of the invention. Examples of the admin client (108) may include, but are not limited to, a desktop computer, a laptop computer, a tablet computer, a server, a smartphone, or any other computing system similar to the exemplary computing system shown in FIG. 5.

In one embodiment of the invention, the support client (110) may represent a physical computing system operated by one or more support specialists of the HCI appliance (102). A support specialist of the HCI appliance (102) may refer to an individual or entity whom may be responsible for troubleshooting problems, errors, and/or issues that may arise on the HCI appliance (102). At least with respect to troubleshooting the aforementioned problems, errors, and/or issues, the support client (110) may interact with the HCI appliance (102) and the SMM (106). To the extent of at least interacting with the latter, the support client (110) may include functionality to, upon request or through periodic pushing, obtain appliance state (detailing a current overall state of the HCI appliance (102)), a global event log (described above), and/or a set of event log inputs (described below) (see e.g., FIG. 2) from the SMM (106); and, subsequently, provide target event classifications (mapped to the aforementioned set of event log inputs) to the SMM (106). The target event classifications may refer to a set of desired (or determined through actual troubleshooting) classifications for a set of event notifications, respectively. Further, a target event classification may refer to a numerical, binary, Boolean, or categorical label that identifies whether any given event notification is a real-event or a non-real-event. Moreover, one of ordinary skill will appreciate that the support client (110) may perform other functionalities without departing from the scope of the invention. Examples of the support client (110) may include, but are not limited to, a desktop computer, a laptop computer, a tablet computer, a server, a smartphone, or any other computing system similar to the exemplary computing system shown in FIG. 5.

In one embodiment of the invention, the RVS (112) may represent a data analytics and classification service. The RVS (112) may be implemented using one or more servers (not shown). Each server may refer to a physical server (residing in a datacenter) or a virtual server (operating in a cloud computing environment). Additionally or alternatively, the RVS (112) may be implemented using one or more computing systems similar to the exemplary computing system shown in FIG. 5. Further, the RVS (112) may be responsible for machine learning classifier training and generation. To that extent, the RVS (112) may include functionality to perform any subset or all of the various steps outlined in the method depicted in FIG. 3. One of ordinary skill will appreciate that the RVS (112) may perform other functionalities without departing from the scope of the invention.

While FIG. 1 shows a configuration of components, other system (100) configurations may be used without departing from the scope of the invention. For example, in one embodiment of the invention, the system (100) may include one or more additional HCI appliances (not shown), where any associated appliance state and/or logged events may be aggregated by the SMM (106) or, alternatively, by one or more additional SMMs (not shown), respectively.

Figure 2:
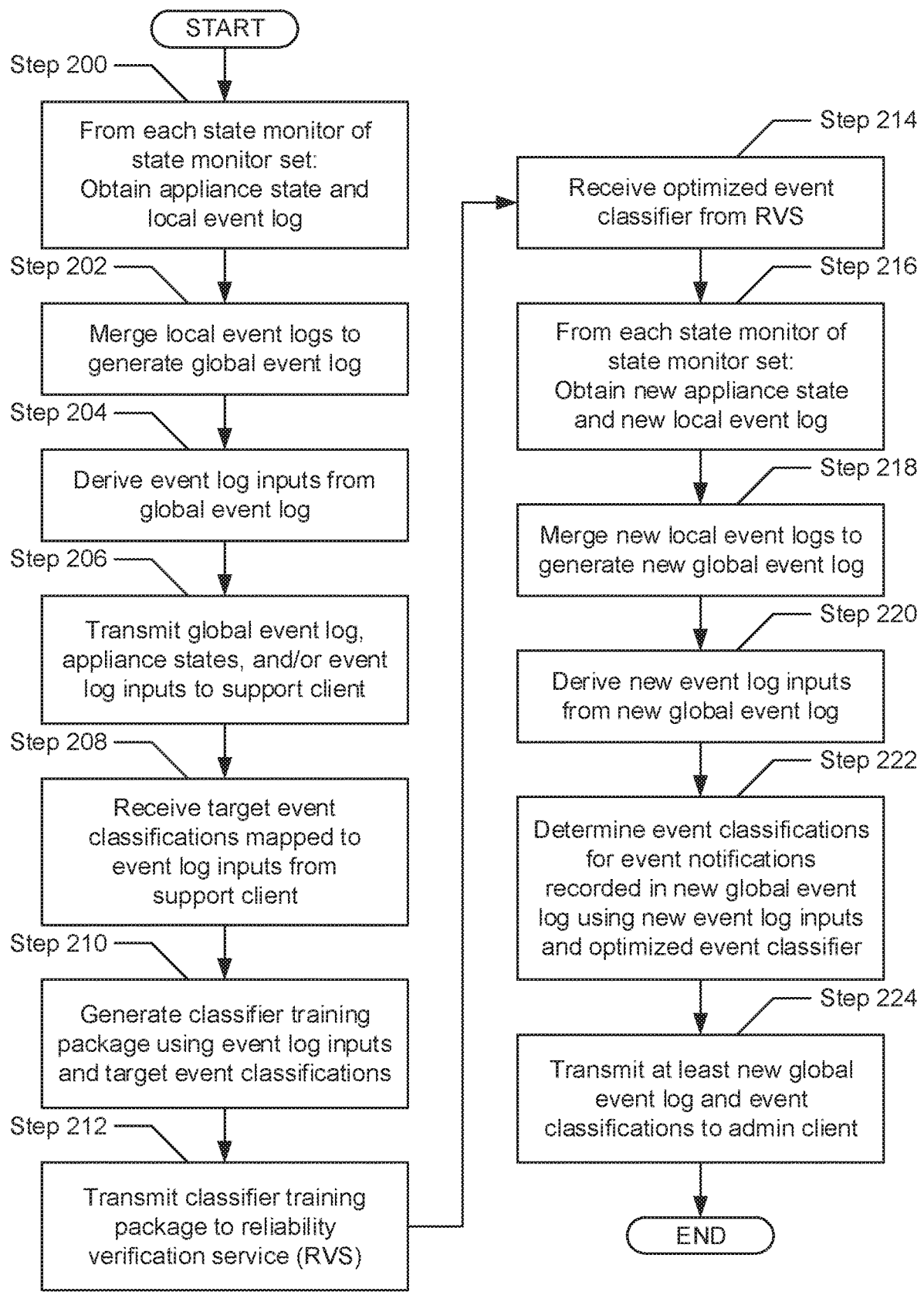
FIG. 2 shows a flowchart describing a method for determining an event classification in accordance with one or more embodiments of the invention.

FIG. 2 shows a flowchart describing a method for determining an event classification in accordance with one or more embodiments of the invention. The various steps outlined below may be performed by the state monitor manager (SMM) (see e.g., FIG. 1). Further, while various steps in the flowchart are presented and described sequentially, one of ordinary skill will appreciate that some or all steps may be executed in different orders, may be combined or omitted, and some or all steps may be executed in parallel.

Turning to FIG. 2, in Step 200, from each state monitor (described above) (see e.g., FIG. 1) of a set of state monitors, appliance state and a local event log are obtained. In one embodiment of the invention, the appliance state may refer to current state information associated with at least one hyper-converged infrastructure (HCI) appliance component that which the state monitor may be configured to track. With respect to any given HCI appliance component, the current state information (for the given HCI appliance component) may encompass one or more values (of one or more ranges of values, respectively), which may be exhibited by one or more parameters, respectively, that describe the current status of one or more features, respectively, associated with the given HCI appliance component. Further, the local event log may refer to a data object (e.g., a file) or a data structure (e.g., table) that records one or more event notifications pertinent to the HCI appliance component(s) tracked by the state monitor. Generally, an event notification may refer to a detailed record of a user-performed or appliance-performed action, which an administrator or support specialist may use to diagnose, predict, and/or resolve issues affecting HCI appliance operations.

In Step 202, the local event logs (obtained in Step 200) are merged to generate a global event log. In one embodiment of the invention, the global event log may refer to a data object (e.g., a file) or a data structure (e.g., table) that reflects a superset of the event notification(s) recorded in the local event logs. The superset of event notifications may include event notifications from different state monitors that detail parallel (or similar) user-performed or appliance-performed actions that may have occurred on the HCI appliance.

In Step 204, a set of event log inputs is derived from the global event log (generated in Step 202). In one embodiment of the invention, the set of event log inputs may refer to a data object (e.g., a file) or a data structure (e.g., a table) that stores one or more classifier input tuples. An example of the set of event log inputs is portrayed in FIG. 4B. Each classifier input tuple may include an ordered series (or sequence) of value labels mapping to the recordation (or acknowledgement) of a given event notification across the set of state monitors, respectively. For example, a classifier input tuple may recite the following series of value labels: {YES, NO, NONE}, which may map to the recordation (or acknowledgement) of a given event notification across a first state monitor, a second state monitor, and a third state monitor, respectively.

Further, by way of the aforementioned example classifier input tuple: (a) the first state monitor may have been configured and capable of detecting a given user-performed or appliance-performed action and, accordingly, may have acknowledged (based on tracked appliance state) that the action represents a true-positive (or real) event—i.e., not an error in event recording; (b) the second state monitor may have been configured and capable of detecting the given user-performed or appliance-performed action and, accordingly, may have acknowledged (based on tracked appliance state) that the action represents a false-positive (or non-real) event—i.e., an error in event recording; and (c) the third state monitor may have not been configured (or incapable) of detecting the given user-performed or appliance-performed action and, accordingly, no acknowledgements could be made, thereby representing an undefined event. Embodiments of the invention are not limited to representing classifier input tuples in the above-exemplified format.

In Step 206, the global event log (generated in Step 202), the appliance states (obtained in Step 200), and the set of event log inputs (derived in Step 204), are transmitted to a support client (see e.g., FIG. 1). In one embodiment of the invention, support specialists, operating the support client, may subsequently use any subset or all of the transmitted information to generate a set of target event classifications. Generation of the set of target event classifications may entail troubleshooting and analyses, conducted by the support specialists, on the above-mentioned superset of event notifications. Further, the set of target event classifications may refer to a data object (e.g., a file) or a data structure (e.g., an array or vector) that reflects desired event classifications. That is, each target event classification (of the set of target event classifications) may map to a classifier input tuple (of the set of event log inputs) and, accordingly, an event notification (of the superset of event notifications), where the target event classification reflects a desired event classification (e.g., a real event or a non-real event) with which the classifier input tuple and the event notification are associated.

In Step 208, the set of target event classifications (generated in response to the transmission of Step 206) is received from the support client. Thereafter, in Step 210, a classifier training package is generated. In one embodiment of the invention, the classifier training package may represent a data object (e.g., a file, an archive-format file) that stores, and may subsequently be generated using, the set of event log inputs (derived in Step 204) and the target event classifications (received in Step 208). Afterwards, in Step 212, the classifier training package (generated in Step 210) is transmitted to a reliability verification service (RVS) (see e.g., FIG. 1). Upon receipt of the classifier training package, the RVS may perform any subset or all of the various steps outlined in the method depicted in FIG. 3 (described below).

In Step 214, an optimized event classifier is subsequently received from the RVS. In one embodiment of the invention, the optimized event classifier may represent a supervised machine learning model optimized to output an event classification, for a given event notification, based on a classifier input tuple mapped to the given event notification. Further, the optimized event classifier may take the form of a classification decision tree—an example of which is illustrated below with respect to FIG. 4G. The optimized event classifier may, moreover, be received as a command or configuration file (e.g., encoded using the eXtensible Markup Language (XML), the JavaScript Object Notation (JSON), or any other existing command or configuration file format).

In Step 216, from each state monitor of the set of state monitors, new appliance state and a new local event log are obtained. In one embodiment of the invention, the new appliance state may refer to more current (or recent) state information associated with at least one HCI appliance component that which the state monitor may be configured to track. Similarly, the new local event log may refer to a data object (e.g., a file) or a data structure (e.g., table) that records at least one more current (or recent) event notification pertinent to the HCI appliance component(s) tracked by the state monitor.

In Step 218, the new local event logs (obtained in Step 216) are merged to generate a new global event log. In one embodiment of the invention, the new global event log may refer to a data object (e.g., a file) or a data structure (e.g., table) that reflects a more current (or recent) superset of the event notification(s) recorded in the new local event logs.

In Step 220, a new set of event log inputs is derived from the new global event log (generated in Step 218). In one embodiment of the invention, the new set of event log inputs may refer to a data object (e.g., a file) or a data structure (e.g., a table) that stores one or more new classifier input tuples, which may map to the one or more new event notifications (of the more current or recent superset of event notifications), respectively.

In Step 222, an event classification is determined for each event notification of the more current (or recent) superset of event notifications recorded in the new global event log (generated in Step 218). In one embodiment of the invention, the event classification, determined for a given event notification, may discern whether the given event notification is a real event (i.e., a true-positive event) or a non-real event (i.e., a false-positive event, which may be interpreted as an error in event recording). Furthermore, each event classification may be determined using the optimized event classifier (received in Step 214) and the classifier input tuple of the new set of event log inputs (derived in Step 220), to which a given event notification, for which the event classification is determined, is mapped. More specifically, the series of value labels recited in the classifier input tuple may be used to traverse (through the node(s) of) the optimized event classifier (see e.g., FIG. 4G) until a leaf of the optimized event classifier is encountered, where the leaf stores the event classification that is to be mapped to the classifier input tuple and, accordingly, the given event notification.

In Step 224, one or more actions is/are performed based at least on the event classification(s) (determined in Step 222). In one embodiment of the invention, an action may encompass the transmission of the event classification(s), along with the new global event log (generated in Step 218), to an admin client (see e.g., FIG. 1). In such an embodiment, administrators of the HCI appliance, which may be operating the admin client, may use the aforementioned transmitted information to optimize a configuration and operations of the HCI appliance. The optimization of HCI appliance configuration and operations could also be automatically (or autonomously) performed by the SMM based on the derived event classification(s) and/or new global event log. In another embodiment of the invention, an action may additionally or alternatively encompass the generation and application of policies, based on the interpretation of the optimized event classifier, which may manipulate the SMM to consider (or depend upon) certain state monitors over others in different scenarios. This action may be manually achieved by administrators or, conversely, automatically (or autonomously) by the SMM. In yet another embodiment of the invention, an action may encompass detecting (and, subsequently, reporting and/or remedying) one or more issues— e.g., component inoperability, appliance state drifting, state monitor reliability degradation, etc.—that appear to be transpiring in the system. This action, similarly, may be performed partially or entirely by administrators and/or the SMM.

Figure 3:
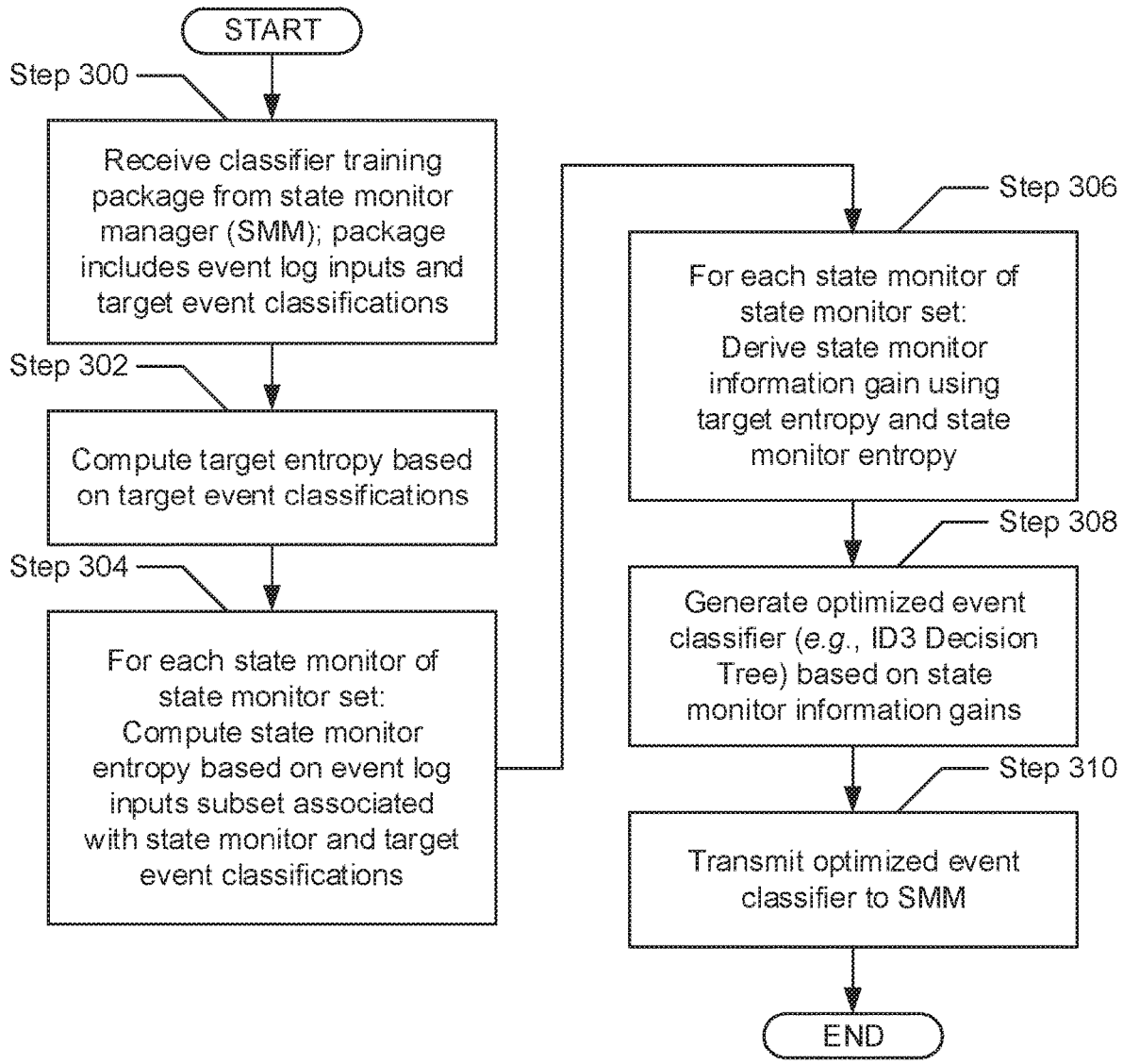
FIG. 3 shows a flowchart describing a method for generating an optimized event classifier in accordance with one or more embodiments of the invention.

FIG. 3 shows a flowchart describing a method for generating an optimized event classifier in accordance with one or more embodiments of the invention. The various steps outlined below may be performed by the reliability verification service (RVS) (see e.g., FIG. 1). Further, while various steps in the flowchart are presented and described sequentially, one of ordinary skill will appreciate that some or all steps may be executed in different orders, may be combined or omitted, and some or all steps may be executed in parallel.

Turning to FIG. 3, in Step 300, from the state monitor manager (SMM) (described above) (see e.g., FIG. 1), a classifier training package is received. In one embodiment of the invention, the classifier training package may represent a data object (e.g., a file, an archive-format file) that includes a set of event log inputs and a set of target event classifications mapped to the former set, respectively. The sets of event log inputs and target event classifications are extensively described above with respect to FIG. 2.

In Step 302, a target entropy is computed based on the set of target event classifications (received in Step 300). In one embodiment of the invention, the target entropy may refer to an information entropy, measured in bits, that quantifies how much information there is in the set of target event classifications. Further, the target entropy may be computed using the following mathematical expression:

$$\text{Entropy(Target)} = -\sum_{i=1}^{n} P(C_i) \cdot \log_2 P(C_i)$$

where n refers to a cardinality of unique class labels exhibited in the set of target event classifications, where $P(C_i)$ refers to a probability of the Ci-th unique class label occurring in the set of target event classifications.

In Step 304, for each state monitor (described above) (see e.g., FIG. 1) of a state monitor set, a state monitor entropy is computed based on the set of target event classifications and a subset of the set of event log inputs (received in Step 300). In one embodiment of the invention, the aforementioned subset of the set of event log inputs may encompass the value label, relevant to the state monitor, specified in each classifier input tuple of the set of event log inputs (see e.g., FIGS. 4D-4F). Further, the state monitor entropy, for a given state monitor, may refer to an information entropy, measured in bits, that quantifies how much information there is in the aforementioned subset of the set of event log inputs relevant to the given state monitor. More precisely, a state monitor entropy may be computed using the following mathematical expressions:

$$\text{Entropy(State Monitor)} = \sum_{j=1}^{m} P(V_j) \cdot \text{Entropy}(V_j)$$

$$\text{Entropy}(V_j) = -\sum_{i=1}^{n} P(V_j \mid C_i) \cdot \log_2 P(V_j \mid C_i)$$

where m refers to a cardinality of unique value labels exhibited in the subset of the set of event log inputs relevant to the state monitor, where $P(V_j)$ refers to a probability of the Vj-th unique value label occurring in the subset of the set of event log inputs relevant to the state monitor, where n refers to a cardinality of unique class labels exhibited in the set of target event classifications, where $P(V_j|C_i)$ refers to a probability of the Vj-th unique value label, occurring in the subset of the set of event log inputs relevant to the state monitor, mapping to the Ci-th unique class label occurring in the set of target event classifications.

In Step 306, for each state monitor of the set of state monitors, a state monitor information gain is derived from the target entropy (computed in Step 302) and the state monitor entropy (computed in Step 304) for the state monitor. In one embodiment of the invention, the state monitor information gain, for a given state monitor, may refer to a difference in information entropy, measured in bits, that quantifies how much information the subset of the set of event log inputs (described above), relevant to the given state monitor, provides regarding the set of target event classifications. Further, the state monitor information gain may be computed using the following mathematical expression:

Information Gain(State Monitor)=Entropy(Target)−Entropy(State Monitor)

In one embodiment of the invention, the state monitor information gain, for a given state monitor, may reflect a measure of reliability associated with the given state monitor in accurately identifying a target (or desired) event classification for a given event notification. That is, the state monitor information gain may reflect the probability with which a certain event classification is expected to be for a given event notification. Accordingly, for a given state monitor, higher state monitor information gain values, measured in bits, are suggestive that the given state monitor carries a higher probability of accurately acknowledging (i.e., classifying) event notifications; and, therefore, the given state monitor is more reliable in determining whether an event notification is directed to a real event (i.e., a true-positive event) or a non-real event (i.e., a false-positive event, which may be interpreted as an error in event recording). In contrast, for a given state monitor, lower state monitor information gain values, measured in bits, are alternatively suggestive that the given state monitor carries a lower probability of accurately acknowledging (i.e., classifying) event notifications; and, therefore, the given state monitor is less reliable in determining whether an event notification is directed to a real event or a non-real event.

In Step 308, an optimized event classifier is generated based at least on the state monitor information gains (derived in Step 306). In one embodiment of the invention, the optimized event classifier may represent a supervised machine learning model optimized to output an event classification, for a given event notification, based on a classifier input tuple mapped to the given event notification. Further, the optimized event classifier may take the form of a classification decision tree. Generation of the optimized event classifier may substantively use an Iterative Dichotomiser 3 (ID3) decision tree learning algorithm (also referred to as the ID3 algorithm) The ID3 algorithm is described in further detail in Quinlan, J. R. 1986. Induction of Decision Trees. Mach. Learn. 1, 1 (March 1986), 81-106, which is hereby referenced and incorporated in its entirety.

In Step 310, the optimized event classifier (generated in Step 308) is subsequently transmitted to the SMM. Specifically, in one embodiment of the invention, transmission of the optimized event classifier may entail encoding the optimized event classifier as a command or configuration file (e.g., using the eXtensible Markup Language (XML), the JavaScript Object Notation (JSON), or any other existing command or configuration file format).

FIGS. 4A-4H show an example scenario in accordance with one or more embodiments of the invention. The following example scenario, presented in conjunction with components shown in FIGS. 4A-4H, is for explanatory purposes only and not intended to limit the scope of the invention.

In providing context to the example scenario, consider an example system (400) (see e.g., FIG. 4A), which is substantively similar to the system configuration shown in FIG. 1. Specifically, the example system (400) includes a hyperconverged infrastructure (HCI) appliance (402) on which three state monitors reside—i.e., a first state monitor (404A), a second state monitor (404B), and a third state monitor (404C). Each of these three state monitors (404A-404C) operatively connect to, and thus is capable of communicating with, a state monitor manager (SMM) (406). In turn, the SMM (406) is operatively connected to, and thus is capable of communicating with, a reliability verification service (RVS) (412). Furthermore, the example system (400) also includes an admin client (408) and a support client (410), which are each operatively connected to, and capable of communicating with, the SMM (406) and the HCI appliance (402).

Proceeding with the example scenario, assume the SMM (406) obtains at least a portion of overall appliance state and a local event log from each of the three state monitors (404A-404C). The three local event logs are subsequently merged to generate a global event log, which records a superset of event notifications collectively recorded by the three state monitors (404A-404C). Thereafter, from the global event log, a set of event log inputs (424) (see e.g., FIG. 4B) is derived, which reflects acknowledgements directed to thirteen event notifications by each of the three state monitors (404A-404C). Specifically, the set of event log inputs (424) encompass a classifier input tuple (426) for each of the aforementioned thirteen event notifications. Furthermore, any given acknowledgement for any given event notification, by any given state monitor (404A-404C), may be expressed through a value label—e.g., {YES, NO, or NONE}.

More specifically, when the acknowledgement of a given event notification, by a given state monitor (404A-404C), is directed to the YES value label, the given state monitor (404A-404C) reports that the given event notification is representative of a true-positive (or real) event. The given state monitor (404A-404C) may arrive at this conclusion at least based on the subset of overall appliance state that which the given state monitor (404A-404C) tracks. Further, a true-positive (or real) event may translate to a justification in event recording.

Conversely, when the acknowledgement of a given event notification, by a given state monitor (404A-404C), is alternatively directed to the NO value label, the given state monitor (404A-404C) reports that the given event notification is representative of a false-positive (or non-real) event. The given state monitor (404A-404C) may arrive at this alternative conclusion at least based on the subset of overall appliance state that which the given state monitor (404A-404C) tracks. Further, a false-positive (or non-real) event may translate to an error in event recording.

Moreover, when the acknowledgement of a given event notification, by a given state monitor (404A-404C), is alternatively directed to the NONE value label, the given state monitor (404A-404C) reports that the given event notification is representative of an undefined event. The given state monitor (404A-404C) may arrive at this alternative conclusion at least based on no records capturing the given event notification. Further, an undefined event may translate to an event that the given state monitor (404A-404C) is neither configured nor capable of detecting.

Returning to the example scenario, following its derivation, the set of event log inputs (424) is subsequently transmitted, by the SMM (406), to the support client (410). In turn, the support client (410) responds by transmitting a set of target event classifications (422), which may have been generated from troubleshooting and/or analyses conducted, on at least the set of event log inputs (424), by support specialists operating the support client (410). The set of target event classifications (422) include a class label—i.e., {YES or NO}—for each of the thirteen event notifications. When associated with a YES class label, a given event notification is representative of a true-positive (or real) event. Alternatively, when associated with a NO class label, a given event notification is instead representative of a false-positive (or non-real) event. Thereafter, the SMM (406) generates a classifier training package using the set of event log inputs (424) and the set of target event classifications (422); and, subsequently, transmits the classifier training package to the RVS (412).

Upon receiving the classifier training package, the RVS (412) follows a decision tree learning algorithm (e.g., the Iterative Dichotomiser 3 (ID3) algorithm) to generate an optimized event classifier based on the encapsulated sets of event log inputs (424) and target event classifications (422). Specifically, as an initial step, a target entropy (see e.g., FIG. 4C), for the set of target event classifications (422), is computed using the following expression:

$$\text{Entropy}(\text{Target}) = -\sum_{i=1}^{n} P(C_i) \cdot \log_2 P(C_i)$$

where n refers to a cardinality of unique class labels exhibited in the set of target event classifications (422),
where $P(C_i)$ refers to a probability of the $C_i$-th unique class label occurring in the set of target event classifications (422).

Figure 4A:
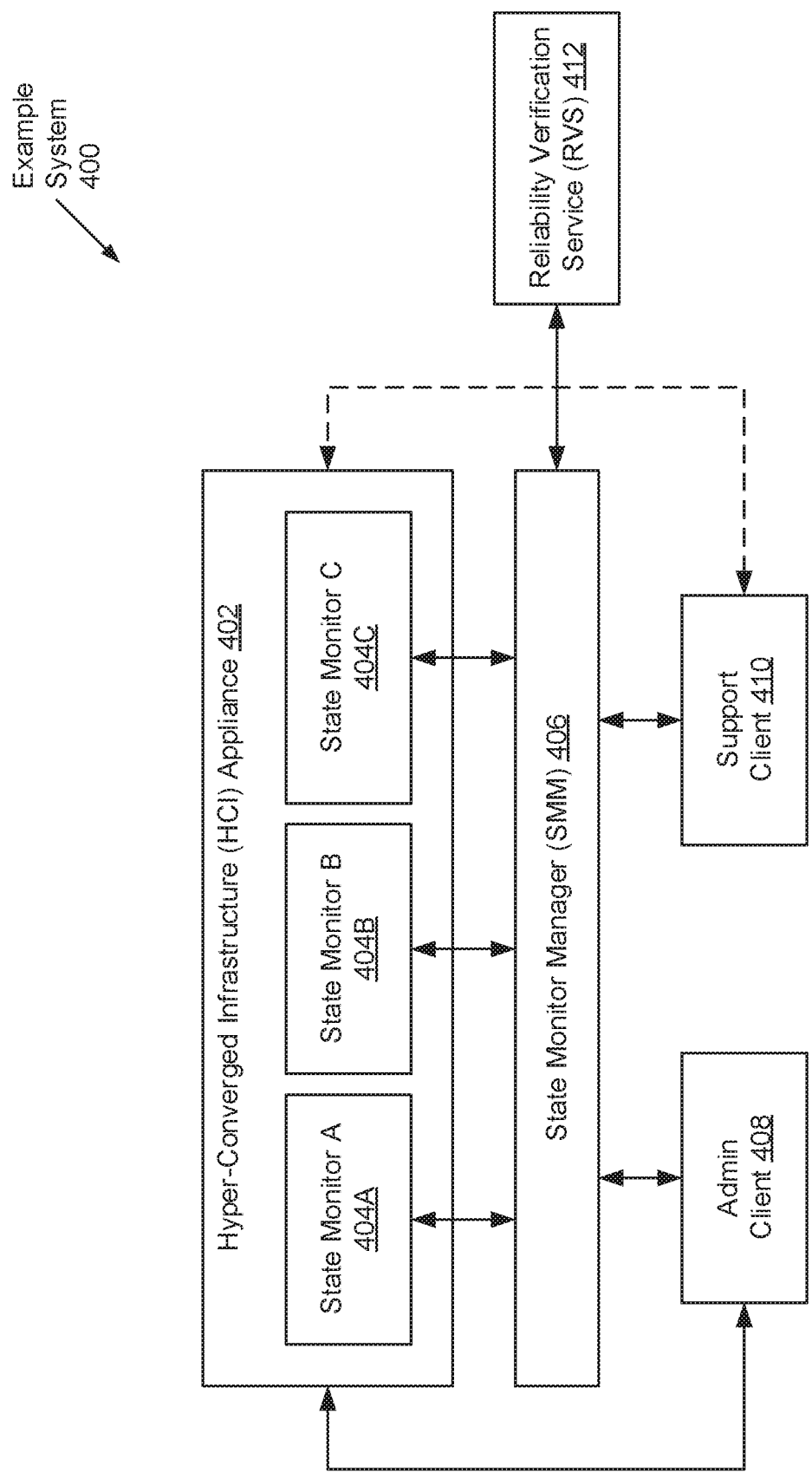
Figure 4C:
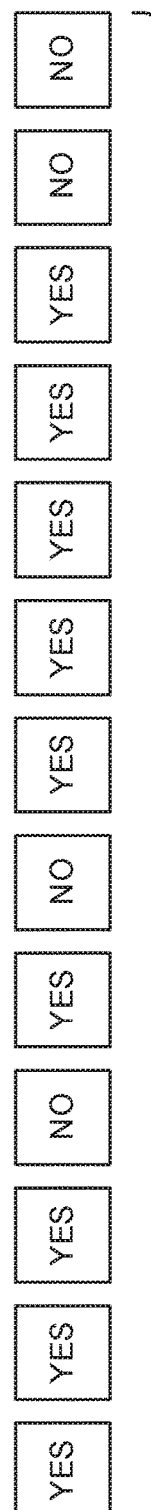

Looking at the set of target event classifications (422), isolated in FIG. 4C, consider the following statistics: (a) there are two unique class labels—i.e., {YES and NO}—exhibited throughout the set of target event classifications (422); (b) there are thirteen total target event classifications (422) mapping to the thirteen event notifications, respectively; and of the thirteen total target event classifications: (i) nine target event classifications are directed to the YES class label; and (ii) four target event classifications are directed to the NO class label. Using the aforementioned statistics, the sought target entropy is obtained by way of the following calculations:

Entropy(Target)=−P(YES)·log$_2$P(YES)−P(NO)·log$_2$P(NO) P(YES)=Probability of YES Classification=9/13

P(NO)=Probability of NO Classification=4/13
Entropy(Target)=−9/13 log$_2$9/13−4/13 log$_2$4/13=0.8905

Accordingly, the target entropy, associated with the set of target event classifications (422), is determined to be approximately 0.8905 bits.

Figure 4D:
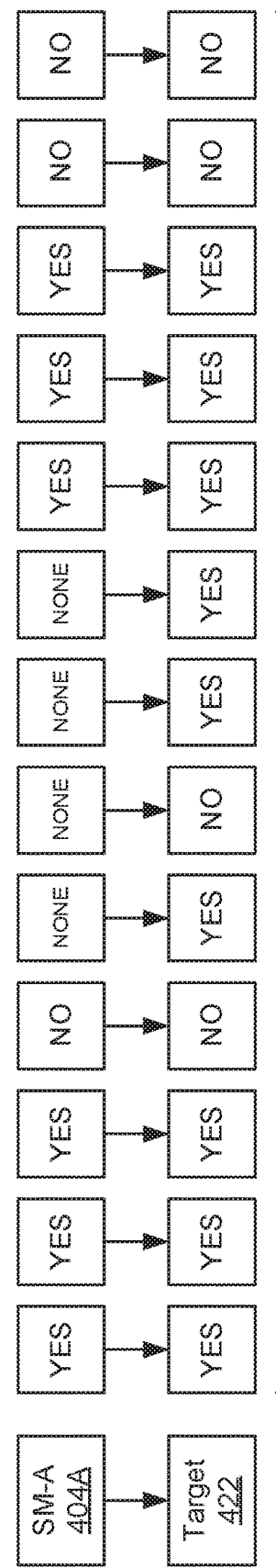
Figure 4G:
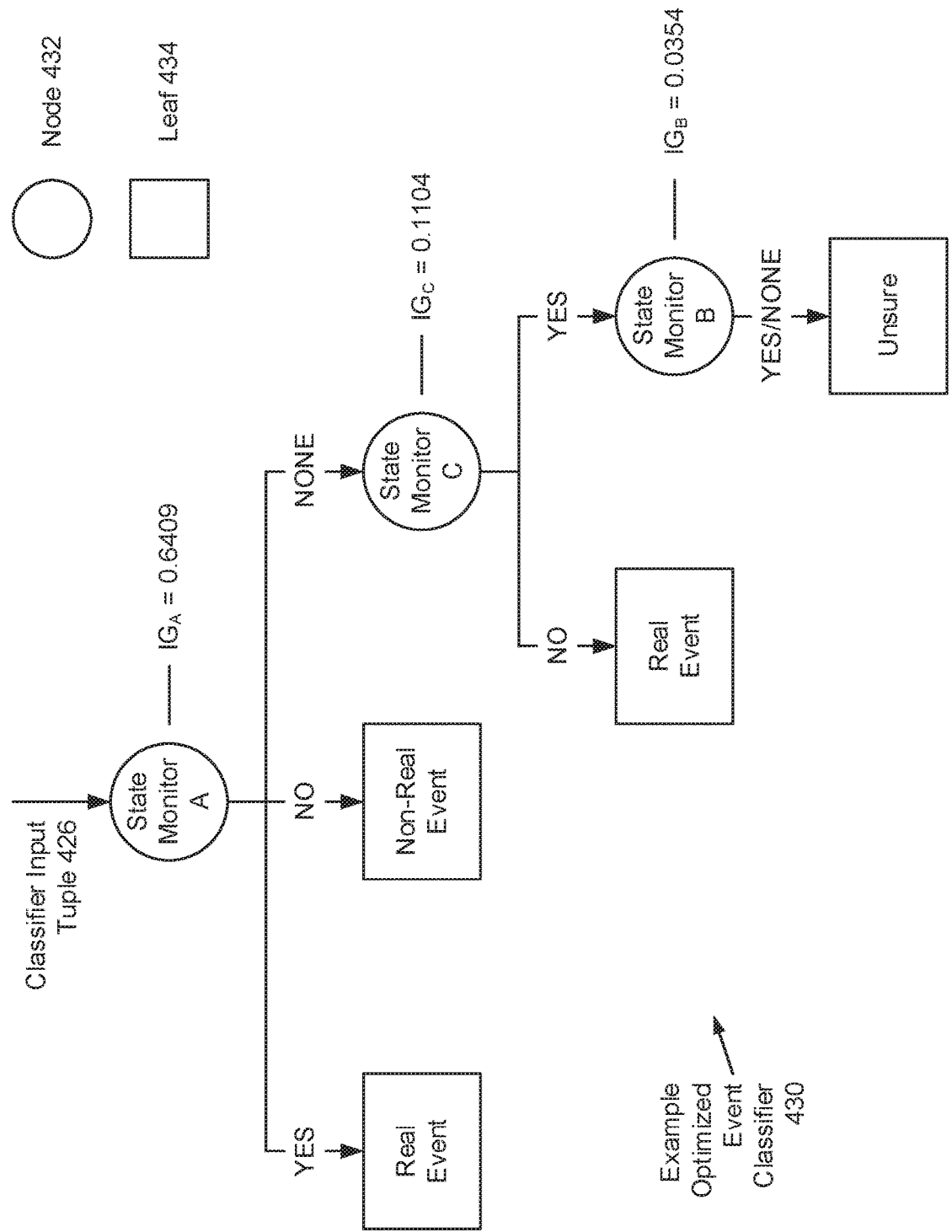

Next, turning to FIG. 4D, a first state monitor entropy, for a subset of the set of event log inputs (424) relevant to the first state monitor (404A), is computed using the following expressions:

$$\text{Entropy}(\text{State Monitor } A) = \sum_{j=1}^{m} P(V_j) \cdot \text{Entropy}(V_j)$$

$$\text{Entropy}(V_j) = -\sum_{i=1}^{n} P(V_j \mid C_i) \cdot \log_2 P(V_j \mid C_i)$$

where m refers to a cardinality of unique value labels exhibited in the subset of the set of event log inputs (424) relevant to the first state monitor (404A),
where $P(V_j)$ refers to a probability of the $V_j$-th unique value label occurring in the subset of the set of event log inputs (424) relevant to the first state monitor (404A),
where n refers to a cardinality of unique class labels exhibited in the set of target event classifications (422),
where $P(V_j|C_i)$ refers to a probability of the $V_j$-th unique value label, occurring in the subset of the set of event log inputs (424) relevant to the first state monitor (404A), mapping to the Ci-th unique class label occurring in the set of target event classifications (422).

Looking at the subset of the set of event log inputs (424), relevant to the first state monitor (404A), mapped to the set of target event classifications (422), isolated in FIG. 4D, consider the following statistics: (a) there are three unique value labels—i.e., {YES, NO, and NONE}—exhibited throughout the subset of the set of event log inputs (424) relevant to the first state monitor (404A); (b) there are thirteen total value labels mapping to thirteen total target event classifications and thirteen event notifications, respectively; (c) of the thirteen total value labels: (i) six value labels are directed to the YES value label; (ii) three value labels are directed to the NO value label; and (iii) four value labels are directed to the NONE value label; (d) there are two unique class labels—i.e., {YES and NO}—exhibited throughout the set of target event classifications (422); (e) of the thirteen total value labels and thirteen total target event classifications: (iv) six value labels (directed to the YES value label) map to class labels directed to the YES class label; (v) zero value labels (directed to the YES value label) map to class labels directed to the NO class label; (vi) zero value labels (directed to the NO value label) map to class labels directed to the YES class label; (vii) three value labels (directed to the NO value label) map to class labels directed to the NO class label; (viii) three value labels (directed to the NONE value label) map to class labels directed to the YES class label; and (ix) one value label (directed to the NONE value label) map to class labels directed to the NO class label. Using the aforementioned statistics, the sought first state monitor entropy is obtained by way of the following calculations:

$$\text{Entropy(State Monitor } A) = P(\text{YES}) \cdot \text{Entropy(YES)} +$$
$$P(\text{NO}) \cdot \text{Entropy(NO)} + P(\text{NONE}) \cdot \text{Entropy(NONE)}$$

$$P(\text{YES}) = \text{Probability of YES Value} = \frac{6}{13}$$

$$P(\text{NO}) = \text{Probability of NO Value} = \frac{3}{13}$$

$$P(\text{NONE}) = \text{Probability of NONE Value} = \frac{4}{13}$$

$$\text{Entropy(YES)} =$$
$$-P(\text{YES}|_{YES}) \cdot \log_2 P(\text{YES}|_{YES}) - P(\text{YES}|_{NO}) \cdot \log_2 P(\text{YES}|_{NO})$$

$$P(\text{YES}|_{YES}) =$$
$$\text{Probability of YES Classification mapped to YES Value} = \frac{6}{6}$$

$$P(\text{YES}|_{NO}) =$$
$$\text{Probability of NO Classification mapped to YES Value} = \frac{0}{6}$$

$$\text{Entropy(YES)} = -\frac{6}{6}\log_2 \frac{6}{6} - \frac{0}{6}\log_2 \frac{0}{6} = 0$$

$$\text{Entropy(NO)} =$$
$$-P(\text{NO}|_{YES}) \cdot \log_2 P(\text{NO}|_{YES}) - P(\text{NO}|_{NO}) \cdot \log_2 P(\text{NO}|_{NO})$$

$$P(\text{NO}|_{YES}) =$$
$$\text{Probability of YES Classification mapped to NO Value} = \frac{0}{3}$$

$$P(\text{NO}|_{NO}) =$$
$$\text{Probability of NO Classification mapped to NO Value} = \frac{3}{3}$$

-continued $$\text{Entropy(NO)} = -\frac{0}{3}\log_2 \frac{0}{3} - \frac{3}{3}\log_2 \frac{3}{3} = 0$$

$$\text{Entropy(NONE)} = -P(\text{NONE}|_{YES}) \cdot \log_2 P(\text{NONE}|_{YES}) -$$
$$P(\text{NONE}|_{NO}) \cdot \log_2 P(\text{NONE}|_{NO})$$

$$P(\text{NONE}|_{YES}) = \text{Probability of YES Classification}$$
$$\text{mapped to NONE Value} = \frac{3}{4}$$

$$P(\text{NONE}|_{NO}) = \text{Probability of NO Classification}$$
$$\text{mapped to NONE Value} = \frac{1}{4}$$

$$\text{Entropy(NONE)} = -\frac{3}{4}\log_2 \frac{3}{4} - \frac{1}{4}\log_2 \frac{1}{4} = 0.8113$$

$$\text{Entropy(State Monitor } A) = \frac{6}{13} \cdot 0 + \frac{3}{13} \cdot 0 + \frac{4}{13} \cdot 0.8113 = 0.2496$$

Therefore, the sought first state monitor entropy, associated with the subset of the set of event log inputs (424), relevant to the first state monitor (404A), is determined to be approximately 0.2496 bits. From here, a first state monitor information gain is subsequently derived using the following calculations:

$$\text{Information Gain(State Monitor } A) =$$
$$\text{Entropy(Target)} - \text{Entropy(State Monitor } A)$$
$$\text{Information Gain(State Monitor } A) = 0.8905 - 0.2496 = 0.6409$$

Accordingly, the sought first state monitor information gain, associated with the subset of the set of event log inputs (424), relevant to the first state monitor (404A), is determined to be approximately 0.6409 bits.

Next, turning to FIG. 4E, a second state monitor entropy, for a subset of the set of event log inputs (424) relevant to the second state monitor (404B), is computed. Looking at the subset of the set of event log inputs (424), relevant to the second state monitor (404B), mapped to the set of target event classifications (422), isolated in FIG. 4E, consider the following statistics: (a) there are three unique value labels—i.e., {YES, NO, and NONE}—exhibited throughout the subset of the set of event log inputs (424) relevant to the second state monitor (404B); (b) there are thirteen total value labels mapping to thirteen total target event classifications and thirteen event notifications, respectively; (c) of the thirteen total value labels: (i) five value labels are directed to the YES value label; (ii) two value labels are directed to the NO value label; and (iii) six value labels are directed to the NONE value label; (d) there are two unique class labels—i.e., {YES and NO}—exhibited throughout the set of target event classifications (422); (e) of the thirteen total value labels and thirteen total target event classifications: (iv) four value labels (directed to the YES value label) map to class labels directed to the YES class label; (v) one value label (directed to the YES value label) maps to class labels directed to the NO class label; (vi) one value label (directed to the NO value label) maps to class labels directed to the YES class label; (vii) one value label (directed to the NO value label) maps to class labels directed to the NO class label; (viii) four value labels (directed to the NONE value label) map to class labels directed to the YES class label; and (ix) two value labels (directed to the NONE value label) map to class labels directed to the NO class label. Using the aforementioned statistics, the sought second state monitor entropy is obtained by way of the following calculations:

$$\text{Entropy(State Monitor } B) = P(\text{YES}) \cdot \text{Entropy(YES)} +$$
$$P(\text{NO}) \cdot \text{Entropy(NO)} + P(\text{NONE}) \cdot \text{Entropy(NONE)}$$
$$P(\text{YES}) = \text{Probability of YES Value} = \frac{5}{13}$$
$$P(\text{NO}) = \text{Probability of NO Value} = \frac{2}{13}$$
$$P(\text{NONE}) = \text{Probability of NONE Value} = \frac{6}{13}$$
$$\text{Entropy(YES)} = -P(\text{YES}|_{YES}) \cdot \log_2 P(\text{YES}|_{YES}) -$$
$$P(\text{YES}|_{NO}) \cdot \log_2 P(\text{YES}|_{NO})$$
$$P(\text{YES}|_{YES}) = \text{Probability of YES Classification}$$
$$\text{mapped to YES Value} = \frac{4}{5}$$
$$P(\text{YES}|_{NO}) = \text{Probability of NO Classification}$$
$$\text{mapped to YES Value} = \frac{1}{5}$$
$$\text{Entropy(YES)} = -\frac{4}{5}\log_2 \frac{4}{5} - \frac{1}{5}\log_2 \frac{1}{5} = 0.7219$$
$$\text{Entropy(NO)} =$$
$$-P(\text{NO}|_{YES}) \cdot \log_2 P(\text{NO}|_{YES}) - P(\text{NO}|_{NO}) \cdot \log_2 P(\text{NO}|_{NO})$$
$$P(\text{NO}|_{YES}) =$$
$$\text{Probability of YES Classification mapped to NO Value} = \frac{1}{2}$$
$$P(\text{NO}|_{NO}) =$$
$$\text{Probability of NO Classification mapped to NO Value} = \frac{1}{2}$$
$$\text{Entropy(NO)} = -\frac{1}{2}\log_2 \frac{1}{2} - \frac{1}{2}\log_2 \frac{1}{2} = 1$$
$$\text{Entropy(NONE)} = -P(\text{NONE}|_{YES}) \cdot \log_2 P(\text{NONE}|_{YES}) -$$
$$P(\text{NONE}|_{NO}) \cdot \log_2 P(\text{NONE}|_{NO})$$
$$P(\text{NONE}|_{YES}) = \text{Probability of YES}$$
$$\text{Classification mapped to NONE Value} = \frac{4}{6}$$
$$P(\text{NONE}|_{NO}) = \text{Probability of NO Classification}$$
$$\text{mapped to NONE Value} = \frac{2}{6}$$
$$\text{Entropy(NONE)} = -\frac{4}{6}\log_2 \frac{4}{6} - \frac{2}{6}\log_2 \frac{2}{6} = 0.9183$$
$$\text{Entropy(State Monitor } B) =$$
$$\frac{5}{13} \cdot 0.7219 + \frac{2}{13} \cdot 1 + \frac{6}{13} \cdot 0.9183 = 0.8551$$

Therefore, the sought second state monitor entropy, associated with the subset of the set of event log inputs (424), relevant to the second state monitor (404B), is determined to be approximately 0.8551 bits. From here, a second state monitor information gain is subsequently derived using the following calculations:

$$\text{Information Gain(State Monitor } B) =$$
$$\text{Entropy(Target)} - \text{Entropy(State Monitor } B)$$
$$\text{Information Gain(State Monitor } B) = 0.8905 - 0.8551 = 0.0354$$

Accordingly, the sought second state monitor information gain, associated with the subset of the set of event log inputs (424), relevant to the second state monitor (404B), is determined to be approximately 0.0354 bits.

Next, turning to FIG. 4F, a third state monitor entropy, for a subset of the set of event log inputs (424) relevant to the third state monitor (404C), is computed. Looking at the subset of the set of event log inputs (424), relevant to the third state monitor (404C), mapped to the set of target event classifications (422), isolated in FIG. 4F, consider the following statistics: (a) there are three unique value labels—i.e., {YES, NO, and NONE}—exhibited throughout the subset of the set of event log inputs (424) relevant to the third state monitor (404C); (b) there are thirteen total value labels mapping to thirteen total target event classifications and thirteen event notifications, respectively; (c) of the thirteen total value labels: (i) seven value labels are directed to the YES value label; (ii) two value labels are directed to the NO value label; and (iii) four value labels are directed to the NONE value label; (d) there are two unique class labels—i.e., {YES and NO} exhibited throughout the set of target event classifications (422); (e) of the thirteen total value labels and thirteen total target event classifications: (iv) four value labels (directed to the YES value label) map to class labels directed to the YES class label; (v) three value labels (directed to the YES value label) map to class labels directed to the NO class label; (vi) two value labels (directed to the NO value label) map to class labels directed to the YES class label; (vii) zero value labels (directed to the NO value label) map to class labels directed to the NO class label; (viii) three value labels (directed to the NONE value label) map to class labels directed to the YES class label; and (ix) one value label (directed to the NONE value label) maps to class labels directed to the NO class label. Using the aforementioned statistics, the sought third state monitor entropy is obtained by way of the following calculations:

$$\text{Entropy(State Monitor } C) = P(\text{YES}) \cdot \text{Entropy(YES)} +$$
$$P(\text{NO}) \cdot \text{Entropy(NO)} + P(\text{NONE}) \cdot \text{Entropy(NONE)}$$
$$P(\text{YES}) = \text{Probability of YES Value} = \frac{7}{13}$$
$$P(\text{NO}) = \text{Probability of NO Value} = \frac{2}{13}$$
$$P(\text{NONE}) = \text{Probability of NONE Value} = \frac{4}{13}$$
$$\text{Entropy(YES)} =$$
$$-P(\text{YES}|_{YES}) \cdot \log_2 P(\text{YES}|_{YES}) - P(\text{YES}|_{NO}) \cdot \log_2 P(\text{YES}|_{NO})$$
$$P(\text{YES}|_{YES}) =$$
$$\text{Probability of YES Classification mapped to YES Value} = \frac{4}{7}$$
$$P(\text{YES}|_{NO}) =$$
$$\text{Probability of NO Classification mapped to YES Value} = \frac{3}{7}$$
$$\text{Entropy(YES)} = -\frac{4}{7}\log_2 \frac{4}{7} - \frac{3}{7}\log_2 \frac{3}{7} = 0.9852$$
$$\text{Entropy(NO)} =$$
$$-P(\text{NO}|_{YES}) \cdot \log_2 P(\text{NO}|_{YES}) - P(\text{NO}|_{NO}) \cdot \log_2 P(\text{NO}|_{NO})$$
$$P(\text{NO}|_{YES}) =$$
$$\text{Probability of YES Classification mapped to NO Value} = \frac{2}{2}$$

-continued $$P(\text{NO}|_{NO}) =$$

Probability of NO Classification mapped to NO Value $= \frac{0}{2}$ $$\text{Entropy(NO)} = -\frac{2}{2}\log_2\frac{2}{2} - \frac{0}{2}\log_2\frac{0}{2} = 0$$

$$\text{Entropy(NONE)} = -P(\text{NONE}|_{YES}) \cdot \log_2 P(\text{NONE}|_{YES}) -$$
$$P(\text{NONE}|_{NO}) \cdot \log_2 P(\text{NONE}|_{NO})$$

$P(\text{NONE}|_{YES}) = $ Probability of YES Classification mapped to NONE Value $= \frac{3}{4}$ $P(\text{NONE}|_{NO}) = $ Probability of NO Classification mapped to NONE Value $= \frac{1}{4}$ $$\text{Entropy(NONE)} = -\frac{3}{4}\log_2\frac{3}{4} - \frac{1}{4}\log_2\frac{1}{4} = 0.8113$$

$$\text{Entropy(State Monitor } C) = \frac{7}{13} \cdot 0.9852 + \frac{2}{13} \cdot 0 + \frac{4}{13} \cdot 0.8113 = 0.7801$$

Therefore, the sought third state monitor entropy, associated with the subset of the set of event log inputs (424), relevant to the third state monitor (404C), is determined to be approximately 0.7801. From here, a third state monitor information gain is subsequently derived using the following calculations:

Information Gain(State Monitor $C$) =

Entropy(Target) − Entropy(State Monitor $C$)

Information Gain(State Monitor $C$) = 0.8905 − 0.7801 = 0.1104

Accordingly, the sought third state monitor information gain, associated with the subset of the set of event log inputs (424), relevant to the third state monitor (404C), is determined to be approximately 0.1104 bits.

Lastly, following the decision tree learning algorithm (e.g., the Iterative Dichotomiser 3 (ID3) algorithm), the optimized event classifier (430) (see e.g., FIG. 4G) is produced based at least on the above-mentioned three state monitor information gains—i.e., 0.6409 bits in association with the first state monitor (404A); 0.0354 bits in association with the second state monitor (404B); and 0.1104 bits in association with the third state monitor (404C). Specifically, the placement of each node (432) of the optimized event classifier (430), representative of value labels associated with a given state monitor (404A-404C), may be successively tiered (i.e., from top to bottom) based on a highest to lowest ordering of the three state monitor information gains. Further, the identification and placement of each leaf (434) of the optimized event classifier (430), representative of class labels exhibited in the set of target event classifications (422), may be determined based on the value label entropy—i.e., Entropy(Vj) above—calculated for each value label associated with the three state monitors (404A-404C). The optimized event classifier (430), at least for the example scenario described herein, includes a leaf (434) storing a class label—i.e., an UNSURE class label, which is not exhibited in the set of target event classifications (422). The UNSURE class label may be associated with event notifications, for which an event classification is too difficult to distinguish from any other event classification, based on the sample sets of event log inputs (424) and target event classifications (422) utilized to train the optimized event classifier (430).

Turning to FIG. 4H, a comparison of the target event classifications (422) versus test event classifications (438) is depicted. Summarily, the set of test event classifications (438) reflects the event classification, determined by the optimized event classifier (430), for each classifier input tuple (426) specified in the set of event log inputs (424). More specifically, a given test event classification (438) determined for a given event notification, results from traversing the optimized event classifier (430) using a given classifier input tuple (426) mapped to the given event notification. For example, consider the following classifier input tuple (426) for the eighth event notification: {SM-A Value=NONE, SM-B Value=YES, SM-C Value=YES}. When traversing the optimized event classifier (430) using the aforementioned classifier input tuple (426), the following traversal path is taken: (a) at the root (or "State Monitor A") node, use the first value label (i.e., SM-A Value=NONE), associated with the first state monitor (404A) and specified in the classifier input tuple (426), to identify which branch to follow from the root node; (b) from the root node, follow the NONE branch to arrive at another node (i.e., a "State Monitor C" node); (c) at this node, use the third value label (i.e., SM-C Value=YES), associated with the third state monitor (404C) and specified in the classifier input tuple (426), to identify which branch to follow from the "State Monitor C" node; (d) from the "State Monitor C" node, follow the YES branch to arrive at yet another node (i.e., a "State Monitor B" node); (e) at this node, use the second value label (i.e., SM-B Value=YES), associated with the second state monitor (404B) and specified in the classifier input tuple (426), to identify which branch to follow from the "State Monitor B" node; (f) from the "State Monitor B" node, follow the YES/NONE branch to arrive at a leaf (424) storing a class label (i.e., the UNSURE class label) expected to be the event classification for the given event notification.

Figure 5:
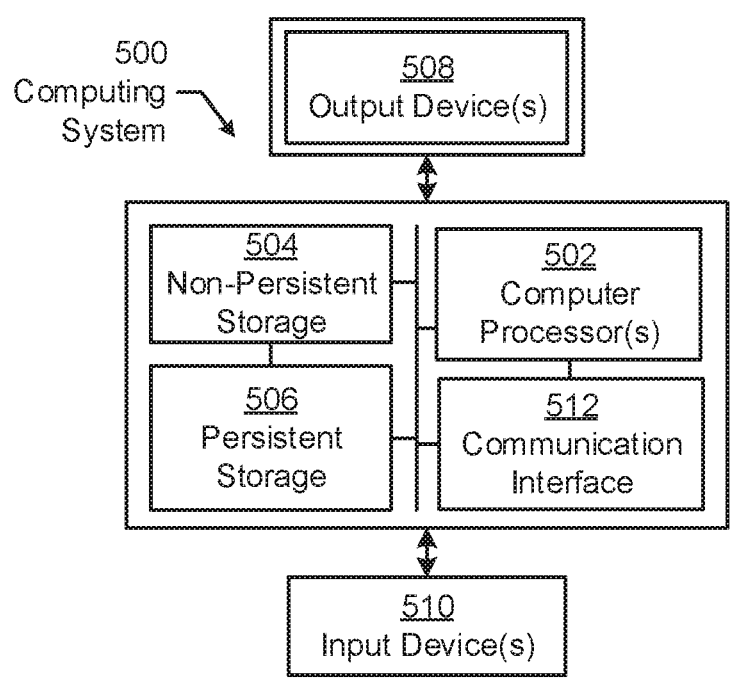
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Summarily, embodiments of the invention are directed to verifying state monitor reliability in HCI appliances. Whether a state monitor is a physical device, a computer program executing on a physical device, or a combination thereof, issues—from data drift to complete inoperability—tend to arise throughout the life of the state monitor. That is, over time and due to a variety of factors, any given state monitor may experience some form of degradation, which may impact the performance and, thus, the reliability associated with the given state monitor. Subsequently, the prevalent dilemma becomes a question of which state monitor to trust with respect to HCI appliance state, especially in scenarios where multiple state monitors report conflicting states for same or similar HCI appliance components. Accordingly, embodiments of the invention address the above-mentioned dilemma through the priority ordering (or ranking) of state monitors based on decision tree classification as described herein. Further, through embodiments of the invention, a highly robust detection mechanism for measuring the stability of state monitoring resources may be achieved. Moreover, embodiments of the invention provide tools (e.g., global event logs, optimized event classifiers, event classifications, etc.), which may be interpreted manually, by administrators and/or support specialists, or automatically (i.e., autonomously), by state monitoring resources, to enhance the efficiency of detecting and/or resolving hardware and/or software issues inflicting the HCI appliance and/or state monitors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reliably classifying event notifications, comprising:
    obtaining a first local event log from a first state monitor and a second local event log from a second state monitor;
    merging the first local event log and the second local event log to generate a first global event log comprising a first event notification and a second event notification;
    deriving, from the first global event log, a first set of event log inputs comprising a first classifier input tuple associated with the first event notification and a second classifier input tuple associated with the second event notification;
    determining, for the first event notification, a first event classification using the first classifier input tuple and an optimized event classifier;
    determining, for the second event notification, a second event classification using the second classifier input tuple and the optimized event classifier; and
    performing a first action based at least on the first event classification and a second action based at least on the second event classification.

2. The method of claim 1, wherein the first classifier input tuple comprises a first label representing a first acknowledgement of the first event notification given by the first state monitor and a second label representing a second acknowledgement of the first event notification given by the second state monitor.

3. The method of claim 2, wherein the first acknowledgement and the second acknowledgement each classify the first event notification as being directed to one selected from a group consisting of a real event, a non-real event, and an undefined event.

4. The method of claim 1, further comprising:
    prior to determining the first event classification:
        obtaining a third local event log from a third state monitor,
        wherein generation of the first global event log further comprises merging the third local event log with the first local event log and the second local event log.

5. The method of claim 4, wherein the first classifier input tuple further comprises a third label representing a third acknowledgement of the first event notification given by the third state monitor.

6. The method of claim 1, wherein the optimized event classifier is a decision tree.

7. The method of claim 1, wherein the first action comprises one selected from a group consisting of optimizing a configuration of a hyper-converged infrastructure appliance, detecting and addressing a first issue inflicting a component of the hyper-converged infrastructure appliance, detecting and addressing a second issue inflicting the first state monitor, detecting and addressing a third issue inflicting the second state monitor, generating and applying a first policy to rely on state reported by the first state monitor over the second state monitor for future event notifications similar to the first event notification, and generating and applying a second policy to rely on state reported by the second state monitor over the first state monitor for future event notifications similar to the first event notification.

8. The method of claim 1, further comprising:
    obtaining a third local event log from the first state monitor and a fourth local event log from the second state monitor;
    merging the third local event log and the fourth local event log to generate a second global event log comprising a second event notification;
    deriving, from the second global event log, a second set of event log inputs comprising a second classifier input tuple associated with the second event notification;
    determining, for the second event notification, a second event classification using the second classifier input tuple and the optimized event classifier; and
    performing a second action based at least on the second event classification.

9. The method of claim 1, further comprising:
prior to obtaining the first and second local event logs:
- obtaining a third local event log from the first state monitor and a fourth local event log from the second state monitor;
- merging the third local event log and the fourth local event log to generate a second global event log comprising a second event notification;
- deriving, from the second global event log, a second set of event log inputs comprising a second classifier input tuple associated with the second event notification; and
- transmitting the second global event log and the second set of event log inputs to a support client.

10. The method of claim 9, further comprising:
receiving, from the support client, a set of target event classifications comprising a target event classification mapped to the second classifier input tuple;
generating a classifier training package comprising the second set of event log inputs and the set of target event classifications;
transmitting the classifier training package to a reliability verification service; and
receiving the optimized event classifier from the reliability verification service from the reliability verification service and in response to transmission of the classifier training package thereto.

11. A system, comprising:
a plurality of state monitors comprising a first state monitor and a second state monitor; and
a state monitor manager operatively connected to the plurality of state monitors, and configured to:
- obtain a first local event log from the first state monitor and a second local event log from the second state monitor;
- merge the first local event log and the second local event log to generate a global event log comprising a first event notification and a second event notification;
- derive, from the global event log, a set of event log inputs comprising a first classifier input tuple associated with the first event notification and a second classifier input tuple associated with the second event notification;
- determine, for the first event notification, a first event classification using the first classifier input tuple and an optimized event classifier;
- determine, for the second event notification, a second event classification using the second classifier input tuple and the optimized event classifier; and
- perform a first action based at least on the first event classification and a second action based at least on the second event classification.

12. The system of claim 11, further comprising:
a hyper-converged infrastructure appliance comprising the plurality of state monitors,
wherein the plurality of state monitors collectively track an overall appliance state associated with the hyper-converged infrastructure appliance.

13. The system of claim 12, wherein the hyper-converged infrastructure appliance further comprises the state monitor manager.

14. The system of claim 12, wherein the state monitor manager resides external, and is operatively connected, to the hyper-converged infrastructure appliance.

15. The system of claim 11, further comprising:
a reliability verification service operatively connected to the state monitor manager, and configured to:
prior to the state monitor manager obtaining the first and second local event logs:
- receive, from the state monitor manager, a classifier training package comprising the set of event log inputs and a set of target event classifications;
- compute a target entropy based on the set of target event classifications;
- compute a first state monitor entropy based on the set of target event classifications and a first subset of the set of event log inputs;
- compute a second state monitor entropy based on the set of target event classifications and a second subset of the set of event log inputs;
- derive a first state monitor information gain using the target entropy and the first state monitor entropy;
- derive a second state monitor information gain using the target entropy and the second state monitor entropy;
- generate the optimized event classifier based at least on the first and second state monitor information gains; and
- transmit the optimized event classifier to the state monitor manager.

16. The system of claim 15, wherein the first state monitor entropy, the first subset of the set of event log inputs, and the first state monitor information gain are each associated with the first state monitor.

17. The system of claim 15, wherein the second state monitor entropy, the second subset of the set of event log inputs, and the second state monitor information gain are each associated with the second state monitor.

18. The system of claim 11, wherein the optimized event classifier is a decision tree.

19. A non-transitory computer readable medium comprising computer readable program code, which when executed by a computer processor, enables the computer processor to:
obtain a first local event log from a first state monitor and a second local event log from a second state monitor;
merge the first local event log and the second local event log to generate a global event log comprising a first event notification and a second event notification;
derive, from the global event log, a set of event log inputs comprising a first classifier input tuple associated with the first event notification and a second classifier input tuple associated with the second event notification;
determine, for the first event notification, a first event classification using the first classifier input tuple and an optimized event classifier;
determine, for the second event notification, a second event classification using the second classifier input tuple and the optimized event classifier; and
perform a first action based at least on the first event classification and a second action based at least on the second event classification.

* * * * *